United States Patent [19]

Reischl et al.

[11] 4,093,569

[45] June 6, 1978

[54] POLYURETHANE RESINS PRODUCED FROM ACTIVE HYDROGEN CONTAINING MATERIAL WHICH IS A DISPERSION OF POLYISOCYANATE-POLYADDITION PRODUCTS IN HYDROXYL CONTAINING COMPOUNDS AS DISPERSING AGENTS

[75] Inventors: Artur Reischl, Leverkusen; Gert Jabs, Cologne; Alberto Carlos Gonzalez-Dörner, Leverkusen, all of Germany

[73] Assignee: Bayer Aktiengesellschaft, Bayerwerk, Germany

[21] Appl. No.: 740,452

[22] Filed: Nov. 10, 1976

[30] Foreign Application Priority Data

Nov. 12, 1975 Germany .............................. 2550796

[51] Int. Cl.$^2$ .............................................. C08G 18/08
[52] U.S. Cl. ..................... 260/2.5 AM; 260/29.2 TN; 260/33.4 UR
[58] Field of Search ............... 260/33.4 UR, 29.2 TN, 260/2.5 AM

[56] References Cited

U.S. PATENT DOCUMENTS 3,360,495 12/1967 Muller et al. ................... 260/30.6 R
3,655,627 4/1972 Hutzler et al. ................ 260/33.4 UR
3,719,621 3/1973 Vogt et al. .................... 260/33.4 UR

FOREIGN PATENT DOCUMENTS 1,044,267 9/1966 United Kingdom ........ 260/29.2 TN

*Primary Examiner*—M. J. Welsh
*Attorney, Agent, or Firm*—Gene Harsh; Joseph C. Gil; William E. Parry

[57] ABSTRACT

This invention relates to the use of certain finely divided, stable and relatively low viscosity dispersions of polyisocyanate polyaddition products in compounds having hyroxyl groups. The dispersions are produced by reacting 1. organic polyisocyanates with
2. compounds having primary and/or secondary amino groups and/or primary hydroxyl groups in
3. compounds having at least one hydroxyl group, wherein compounds (3) have secondary hydroxyl groups in cases when compounds (2) have primary hydroxyl groups and wherein the components are reacted in the presence of more than 4% by weight of water, based on the quantity of reaction mixture including water.

3 Claims, No Drawings

POLYURETHANE RESINS PRODUCED FROM ACTIVE HYDROGEN CONTAINING MATERIAL WHICH IS A DISPERSION OF POLYISOCYANATE-POLYADDITION PRODUCTS IN HYDROXYL CONTAINING COMPOUNDS AS DISPERSING AGENTS

BACKGROUND OF THE INVENTION

Diisocyanate polyaddition products dispersed in polyethers or polyesters are already known. According to the teaching given in German Auslegeschrift No. 1,168,075 U.S. Pat. No. 3,360,495, diisocyanates are reacted with bifunctional primary alcohols in a dispersing medium consisting of a polyether or polyester having a molecular weight of from 500 to 3000 containing at least two, exclusively secondary, hydroxyl groups in the molecule. According to German Auslegeschrift No. 1,260,142 U.S. Pat. No. 3,325,421, compounds containing isocyanate and amino groups are made to undergo a polyaddition reaction in situ in a polypropylene glycol ether as dispersing agent. The dispersions of polyurethanes, polyureas or polyhydrazodicarbonamides in polyvalent, high molecular weight hydroxyl compounds obtained by the above mentioned processes are recommended as thickeners for the textile or dye industry because of their high viscosities, even at low solid contents. Thus, a 10 or 20% dispersion of polyhydrazodicarbonamide in a polypropylene glycol ether obtained according to German Auslegeschrift No. 1,260,142, for example, has a viscosity of over 10,000 (200,000) cP at 25° C. This amounts to more than 10 (200) times the viscosity of the pure dispersing agent. When attempts are made to prepare a 40% dispersion, the reaction mixture solidifies before polyaddition has been completed. The high viscosities which occur at even relatively low solid contents seriously restrict the use of the products because, in many fields of application they cannot be dosed with the usual dosing apparatus. For producing polyurethane foams, for example, a purpose for which such dispersions have been recommended according to an earlier proposal by the present Applicants, the viscosities of the starting materials must be below 2500 cP when the conventional high pressure machines are employed.

According to another earlier proposal, substantially anhydrous, relatively low visocisity dispersions of polyureas and/or polyhydrazodicarbonamides in polyethers having hydroxyl groups can be obtained if the polyaddition reaction is carried out continuously in continuous flow mixers. The process has the disadvantage of requiring a relatively complicated technique of dosing and mixing which is uneconomic for customary production rates. Moreover, in some cases high solids concentrations may give rise to considerable difficulties in the removal of the heat of reaction.

DESCRIPTION OF THE INVENTION

It has now surprisingly been found that stable dispersions having the desired low viscosity can be produced if the polyaddition reaction is carried out in situ in a mixture of compounds having hydroxyl groups and a substantial quantity of water which may optionally be removed by distillation after the polyaddition reaction.

A water content of 10, 15 or 20% by weight (based on the total quantity of polyether and water), for example, increases the viscosity of a polyalkylene ether glycol at 25° C to 4, 8 and 50 times, respectively. The original value (3500, 7300 and over 50,000 cP). If the water content is further increased, the solution or emulsion originally obtained in many cases separates into its various phases. Both the high increase in viscosity and the phase separation inevitable led the experts to assume that the addition of water would be unsuitable for the commercial production of low viscosity polyisocyanate polyaddition products in compounds containing hydroxyl groups. This was particularly since it was suspected that water might also interface chemically with the isocyanate polyaddition reaction.

The above-mentioned low viscosity, stable dispersions of polyisocyanate polyaddition products in hydroxyl containing compounds as dispersing agents may be prepared in situ by the reaction of 1. organic polyisocyanates with
2. compounds having primary and/or secondary amino groups and/or primary hydroxyl groups and optionally, formaldehyde in,
3. compounds having at least one hydroxyl group, compounds (3) containing secondary hydroxyl groups in cases where compounds (2) contain primary hydroxyl groups. The components are reacted in the presence of more than 4% by weight, preferably from 7 to 35% by weight of water and most preferably from 10 to 25% by weight of water, based on the quantity of reaction mixture including water. If desired the water is subsequently removed in known manner.

The compounds used as component (2) are preferably polyamines and/or hydrazines and/or hydrazides.

In another embodiment of the process reactants (1) and/or (2) may in part consist of monoisocyanates and/or primary or secondary monoamines and/or monohydrazides for the purpose of adjusting the product to a given molecular weight. Hydroxyalkylamines may also be used in the polyaddition reaction for the same purpose. In this way there are also obtained polyurea or polyhydrazodicarbonamide particles containing reactive groups.

A certain proportion of substances which have an emulsifying action and stabilize the dispersion, such as polyethers containing amino, semicarbazide or hydrazide groups, may also be used.

Hitherto unknown stable dispersions have also been found which have a solids content of from 10 to 60% by weight, of polyureas or polyhydrazodicarbonamides in hydroxyl compounds having a molecular weight of between 62 and 400 or in hydroxyl compounds essentially consisting of more than 30% by weight and preferably more than 50% by weight of polyesters and/or polyester amides and/or polycarbonates having a molecular weight of between 400 and 12,000, preferably between 800 and 8000.

The dispersing agents are the substances forming the external continuous phase in the present invention. They include alcohols having a molecular weight of from about 62 to about 16,000, preferably from 62 to 12,000, and most preferably 106 to 8000 containing from 1 to 8, preferably from 2 to 6 and most preferably from 2 to 4 primary and/or secondary hydroxyl groups.

These include, for example, both low molecular weight alochols or glycols having a molecular weight of between about 62 and about 400 and which may also contain ether, thioether or ester bonds and polyesters, polyethers, polythioethers, polyacetals, polycarbonates and polyester amides having molecular weights of more than 400, such as those known per se for the production of polyurethanes.

Suitable low molecular weight dispersing agents include monohydric alcohols such as butanol, 2-ethylhexanol, amyl alcohol and ethylene glycol monoethylether. Diols or triols of the kind conventionally used as chain lengthening agents or cross-linking agents in polyurethane chemistry are also suitable, e.g. propylene glycol-(1,2) and -(1,3), butylene glycol-(1,4) and -(2,3); hexanediol-(1,6); octane diol-(1,8); neopentyl glycol; cyclohexane dimethanol (1,4-bis-hydroxymethylcyclohexane); 2-methyl-1,3-propanediol; glycerol; trimethylolpropane; hexane triol-(1,2,6); butanetriol-(1,2,4) or trimethylolethane, and particularly glycols having a hydrophilic character, e.g. ethylene glycol; diethyleneglycol; triethylene glycol or tetraethylene glycol and polyethylene glycols having a molecular weight of up to 400. In addition compounds such as dipropylene glycol, polypropylene glycols having a molecular weight of up to 400, dibutylene glycol, polybutylene glycols having a molecular weight of up to 400, thiodiglycol and castor oil may also be used as dispersing agents. Also suitable are ester diols of the general formulae

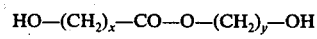
HO—(CH$_2$)$_x$—CO—O—(CH$_2$)$_y$—OH and

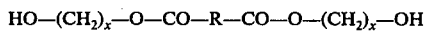
HO—(CH$_2$)$_x$—O—CO—R—CO—O—(CH$_2$)$_x$—OH in which
R represents an alkylene or arylene group having from 1 to 10 preferably 2 to 6 carbon atoms,
$x = 2$ to 6 and
$y = 3$ to 5,
e.g. δ-hydroxybutyl-ε-hydroxy-caproic acid ester; ω-hydroxyhexyl-γ-hydroxybutyric acid ester; adipic acid-bis-(β-hydroxyethyl) ester and terephthalic acid-bis-(β-hydroxyethyl)-ester; as well as diolurethanes of the general formula

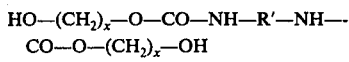
HO—(CH$_2$)$_x$—O—CO—NH—R'—NH—CO—O—(CH$_2$)$_x$—OH in which
R' represents an alkylene, cycloalkylene or arylene group having from 2 to 15, preferably 2 to 6 carbon atoms and
$x$ represents an integer of from 2 to 6, e.g. 1,6-hexamethylene-bis-(β-hydroxyethylurethane) or 4,4'-diphenylmethane-bis-(δ-hydroxybutylurethane).
Also suitable are diol ureas of the general formula

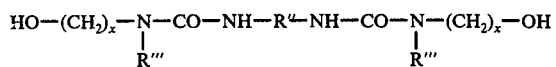
HO—(CH$_2$)$_x$—N—CO—NH—R"—NH—CO—N—(CH$_2$)$_x$—OH
　　　　　　|　　　　　　　　　　　　　　　|
　　　　　　R'''　　　　　　　　　　　　　 R''' in which

R" represents an alkylene, cycloalkylene or arylene group having from 2 to 15 and preferably 2 to 9 carbon atoms,
R''' represents hydrogen or a methyl group and
$x = 2$ or 3,
e.g. 4,4'-diphenylmethane-bis-(β-hydroxyethylurea) or the compound

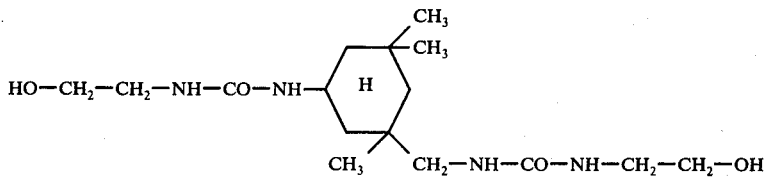

Particularly suitable among the dihydric and trihydric low molecular weight alcohols are those which, either alone or as mixtures or with the addition of higher molecular weight alcohols, are liquid at temperatures below 50° C.

It has been found that in some cases when low molecular weight dispersing agents and where substantially linear polyisocyanate addition compounds are used, solutions rather than dispersions are formed. In this context, solution means a clear, uniform and homogeneous mixture of polyaddition product and dispersing agent. Such solutions are not intended to be covered by the term "dispersion" as used throughout the specification. It has been found, however, that formation of a solution can be easily avoided by the presence of small amounts of water in the dispersing agent. Generally, an amount of water of about 1%, by weight, based on the total weight of the dispersion is sufficient to avoid the formation of a solution. However, as set forth below, the amount of water in the dispersions may be varied within wide limits depending on the particular system involved and the intended use. In most cases, however, the dispersions may be made completely water-free without being undesirably converted into solutions.

Higher molecular weight hydroxyl polyesters which are suitable as dispersing agents include e.g. reaction products of polyhydric, preferably dihydric alcohols to which trihydric alcohols may be added and polybasic, preferably dibasic carboxylic acids. Instead of free polycarboxylic acids, the corresponding polycarboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated. The following are mentioned as examples: succinic acid; adipic acid; suberic acid; azelaic acid; sebacic acid, phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids such as oleic acid; which may be mixed with monomeric fatty acids; dimethyl terephthalate and bis-glycolterephthalate. Suitable polyhydric alcohols include e.g. ethylene glycol; propylene glycol-(1,2) and -(1,3); butylene glycol-(1,4) and -(2,3); hexanediol-(1,6); octane-diol-(1,8); neopentylglycol; cyclohexanedimethanol (1,4-bis-hydroxymethylcyclohexane); 2-methyl-1,3-propanediol; glycerol, trimethylolpropane; hexanetriol-(1,2,6); butanetriol- (1,2,4); trimethylolethane; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, e.g. ε-caprolactam, or hydroxycarboxylic acids, e.g. ω-hydroxycaproic acid, may also be used.

The higher molecular weight polyethers which are preferably used as dispersing agents are obtained in known manner by reaction of the starting compounds which contain reactive hydrogen atoms with alkylene oxides such as ethylene oxide; propylene oxide; butylene oxide; styrene oxide; tetrahydrofuran or epichlorohydrin or with any mixtures of these alkylene oxides. In many cases, it is preferred to use polyethers which contain predominantly primary hydroxyl groups.

Suitable starting compounds containing reactive hydrogen atoms include e.g. water; methanol; ethanol; ethylene glycol; propylene glycol-(1,2) or -(1,3); butylene glycol-(1,4) or -(2,3); hexanediol-(1,6); octanediol-(1,8); neopentyl glycol; 1,4-bis-hydroxymethylcyclohexane; 2-methyl-1,3-propanediol; glycerol; trimethylolpropane; hexanetriol-(1,2,6); butanetriol-(1,2,4); trimethylolethane; pentaerythritol; mannitol; sorbitol; methyl glycoside; sucrose; phenol; isononylphenol; resorcinol; hydroquinone; 1,2,2- or 1,1,3-tris-(hydroxyphenyl)-ethane; ammonia; methylamine; ethylene diamine; tetra- or hexamethylene diamine; diethylenetriamine; ethanolamine; diethanolamine; triethanolamine; aniline; phenylenediamine; 2,4- and 2,6-diaminotoluene and polyphenylpolymethylene polyamines of the kind obtained by aniline-formaldehyde condensation. Resinous materials such as phenol and resol resins may also be used as the starting materials.

Polyethers modified by vinyl polymers are also suitable for the process according to the invention. Products of this kind may be obtained by polymerizing, e.g. styrene and acrylonitrile in the presence of polyethers (U.S. Pat. Nos. 3,383,351; 3,304,273; 3,523,095; 3,110,695 and German Pat. No. 1,152,536).

Among the polythioethers which should be particularly mentioned are the condensation products obtained from thiodiglycol on its own and/or with other glycols, dicarboxylic acids, formaldehyde, aminocarboxylic acids or aminoalcohols. The products obtained are either polythiomixed ethers, polythio ether esters or polythioether ester amides, depending on the cocomponents.

Suitable polyacetals include the compounds which can be prepared from glycols such as diethylene glycol; triethylene glycol; 4,4'-dioxethoxy-diphenyldimethylene; hexanediol and formaldehyde. Suitable polyacetals may also be prepared by the polymerization of cyclic acetals.

Polycarbonates containing hydroxyl groups include those known per se such as the products obtained from the reaction of diols such as propanediol-(1,3), butanediol-(1,4) and/or hexanediol-(1,6), diethyleneglycol, triethylene glycol or tetraethylene glycol with diarylcarbonates, e.g. diphenylcarbonate, or phosgene.

Suitable polyester amides and polyamides include the predominantly linear condensates obtained from polyvalent saturated and unsaturated carboxylic acids or their anhydrides and polyvalent saturated and unsaturated amino alcohols, diamines, polyamines or mixtures thereof.

As previously mentioned, mixtures of the above mentioned high molecular weight and low molecular weight dispersing agents may of course also be used.

The dispersing agents which are preferred are those which are free from any labile groups (e.g. ester groups) which are liable to be destroyed by hydrolysis of aminolysis in the process. Compounds of this kind are preferably only added to the finished dispersion after completion of the polyaddition reaction.

The hydroxyl compounds and mixtures thereof used as dispersing agents should be chosen so that when mixed with the water to be added, with any hydroxyl compounds or preferably amino compounds, and optionally inert solvents, they are liquid at the reaction temperature, i.e. in the form of solutions or emulsions. Their viscosity at the reaction temperature should generally be below 20,000 cP and preferably below 5000 cP so that conventional stirrer and mixing apparatus can be employed.

If inert solvents are to be used, they should preferably distill off as azeotropic mixtures with water, for example, benzene and toluene.

The isocyanate reactive components used for the preparation of the dispersions are mainly polyamines, hydrazines and hydrazides. Suitable polyamines include divalent and/or higher valent primary and/or secondary aliphatic, araliphatic, cycloaliphatic and aromatic amines, e.g. ethylene diamine, 1,2- and 1,3-propylene diamine; tetramethylenediamine; hexamethylenediamine; dodecamethylene; diamine; dimethyldiaminohexane; N,N'-dimethylethylenediamine; 2,2-bis-aminopropylmethylamine; higher homologues of ethylene diamine such as diethylenetriamine; triethylenetetramine and tetraethylenepentamine; homologues of propylenediamine such as dipropylenetriamine; piperazine; N,N'-bis-aminoethylpiperazine; triazine; 4-aminobenzylamine; 4-aminophenylethylamine; 1-amino-3,3,5-trimethyl-5-aminomethylcyclohexane; 4,4'-diaminodicyclohexyl-methane and -propane; 1,4-diaminocyclohexane; phenylenediamines; naphthylene diamines; condensates of aniline and formaldehyde; tolylene diamines; bis-aminomethylbenzene and derivatives of the above mentioned aromatic amines monoalkylated on one or both nitrogen atoms. The polyamines generally have a molecular weight of from about 60 to about 10,000, preferably 60 to 3000 and most preferably 60 to 1000.

Suitable hydrazines include hydrazine itself and monosubstituted or N,N'-disubstituted hydrazines in which the substituents may be $C_1$ to $C_6$ alkyl groups, cyclohexyl groups or phenyl groups. The hydrazines generally have a molecular weight of from 32 to 500. Hydrazine itself is preferred.

Suitable hydrazides include the hydrazides of divalent or higher valent carboxylic acids such as carbonic acid, oxalic acid, malonic acid, succinic acid, adipic acid, sebacic acid, azelaic acid, maleic acid, fumaric acid, phthalic acid, isophthalic acid or terephthalic acid; the esters of hydrazine monocarboxylic acids with divalent or higher valent alcohols and phenols such as ethanediol, propanediol-(1,2), butanediol-(1,2), -(1,3), and -(1,4), hexanediol, diethylene glycol, triethyleneglycol, tetraethylene glycol, dipropylene glycol, tripropyleneglycol and hydroquinone as well as the amides of hydrazine monocarboxylic acid (semi-carbazides), e.g. with the above mentioned diamines and polyamines. The hydrazides used generally have a molecular weight of from about 90 to about 10,000, preferably 90 to 3000 and most preferably from 90 to 1000.

The amines and hydrazines mentioned above may either be used in the form of their dilute aqueous solutions or as mixtures with the dispersing agent diluted with the necessary quantity of water.

Suitable starting components also include aliphatic, cycloaliphatic, araliphatic, aromatic and heterocyclic polyisocyanates such as those described, for example, by W. Siefken in Justus Liebigs Annalen der Chemie, 562, pages 75 to 136, for example, ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and any mixtures of these isomers; 1-isocyanato-3,3,5-trimethyl-5-isocyanatomethylcyclohexane as described in German Auslegeschrift No. 1,202,785 and U.S. Pat. No. 3,401,190; 2,4- and 2,6-hexahydrotolylene diisocyanate and any mixtures of these isomers; hexahydro-1,3- and/or -1,4-phenylene diisocyanate; perhydro-2,4'- and/or -4,4'-diphenylmethane diisocyanate; 1,3- and 1,4-phenylenediisocyanate; 2,4- and 2,6-tolylene diisocyanate and any mixtures of these isomers; diphenylmethane-2,4'- and/or 4,4'-diisocyanate; naphthylene-1,5-diisocyanate; triphenylmethane-4,4',4''-triisocyanate; polyphenyl-polymethylene polyisocyanates of the kind which can be obtained by aniline formaldehyde condensation followed by phosgenation and which have been described, for example, in British patent specification Nos. 874,430 and 848,671, m- and p-isocyanatophenylsulphonylisocyanates according to U.S. Pat. No. 3,454,606; perchlorinated aryl polyisocyanates such as those described e.g. in German Auslegeschrift No. 1,157,601 and U.S. Pat. No. 3,277,138; polyisocyanates containing carbodiimide groups as described in German Pat. No. 1,092,007 and U.S. Pat. No. 3,152,162; diisocyanates of the kind described in U.S. Pat. No. 3,492,330, polyisocyanates having allophanate groups as described, e.g. in British patent specification No. 994,890; Belgian Pat. No. 761,626 and published Dutch Patent Application No. 7,102,524; polyisocyanates having isocyanurate groups as described e.g. in U.S. Pat. No. 3,001,973; German Pat. Nos. 1,022,789; 1,222,067 and 1,027,394 and in German Offenlegungsschriften Nos. 1,929,034 and 2,004,048; polyisocyanates with urethane groups, e.g. as described in Belgian Pat. No. 752,261 and U.S. Pat. No. 3,394,164; polyisocyanates having acylated urea groups according to German Pat. No. 1,230,778; polyisocyanates with biuret groups as described e.g. in German Pat. No. 1,101,394; U.S. Pat. Nos. 3,124,605 and 3,201,372 and British patent specification No. 889,050 polyisocyanates prepared by telomerization reactions as described e.g. in U.S. Pat. No. 3,654,106; polyisocyanates with ester groups, for example, those mentioned in British patent specification Nos. 965,474 and 1,072,956; U.S. Pat. No. 3,567,763 and German Pat. No. 1,231,688; reaction products of the above mentioned isocyanates with acetals according to German Pat. No. 1,072,385 and polyisocyanates containing polymeric fatty acid groups according to U.S. Pat. No. 3,455,883.

The distillation residues containing isocyanate groups obtained from the commercial production of isocyanates may also be used, if desired as solutions in one or more of the above mentioned polyisocyanates. Any mixtures of the above mentioned polyisocyanates may also be used.

It is generally preferred to use commercially readily available polyisocyanates, for example, 2,4- and 2,6-tolylene diisocyanate and any mixtures of these isomers ("TDI"); polyphenyl-polymethylene polyisocyanates which can be prepared by aniline-formaldehyde condensation followed by phosgenation ("crude MDI"); and polyisocyanates which have carbodiimide groups, urethane groups, allophanate groups, isocyanurate groups, urea groups or biuret groups ("modified polyisocyanates").

So-called prepolymers may, of course, also be used as isocyanate components, i.e. reaction products of low molecular weight and/or higher molecular weight compounds having hydroxyl and/or amino groups, e.g. those of the kind mentioned above, with an excess of the monomeric polyisocyanates described above.

Some or all of the isocyanates or amines, hydrazines or hydrazides used in the process may also have a functionality higher than 2. It must be regarded as surprising that the reaction according to the invention of such higher functional compounds in dispersing agents which have hydroxyl groups does not result in solid or at least very highly viscous reaction products but rather gives rise to finely divided, low viscosity dispersions.

The polyaddition products produced by the process which are dispersions in compounds containing hydroxyl groups may, as already mentioned above, be modified by the addition of a proportion of monofunctional isocyanates, amines, hydrazine derivatives.

Thus, for example, the average molecular weight of polyaddition products can be adjusted as desired by the incorporation of such monofunctional compounds. Polyureas or polyurea polyhydrazodicarbonamides containing free hydroxyl groups can be obtained by using alkanolamines having primary or secondary amino groups. The introduction of other groups such as ester groups, longer aliphatic groups, tertiary amino groups, active double bonds, etc. can also be achieved by the addition of suitably substituted monoamines, diamines or isocyanates.

Suitable monofunctional isocyanates include e.g. alkyl isocyanates such as methyl; ethyl; isopropyl; isobutyl; hexyl; lauryl and stearyl isocyanate; chlorohexyl isocyanate; cyclohexyl isocyanate; phenyl isocyanate; tolyl isocyanate; 4-chlorophenylisocyanate and diisopropylphenylisocyanate.

Suitable monoamines include e.g. alkylamines and dialkylamines containing $C_1$–$C_{18}$ alkyl groups; cycloaliphatic amines such as cyclohexylamine and its homologues; aniline and N-alkylanilines and aniline derivatives which are substituted in the benzene ring; alkanolamines such as ethanolamine, diethanolamine, propanolamine, dipropanolamine, butanolamine and dibutanolamine and diamines having a tertiary and a primary or secondary amino group, e.g. N,N-dimethylethylene-diamine and N-methylpiperazine. Suitable monofunctional hydrazine derivatives and hydrazides includes e.g. N,N-dialkylhydrazines, the hydrazides of monocarboxylic acids, hydrazine monocarboxylic acid esters of monofunctional alcohols or phenols, and semicarbazides, e.g. methyl, ethyl, propyl, butyl, hexyl, dodecyl, stearyl, phenyl and cyclohexylsemicarbazide.

The molecular weight of the polyaddition products as dispersions in hydroxyl compounds is determined by the proportion by weight of polyamine, hydrazine or hydrazide on the one hand to polyisocyanate on the other (and monofunctional compounds if added). It is particularly preferred to react approximately equivalent quantities of isocyanates and hydroxyl functional or preferably amino functional compounds in the hydroxyl containing dispersing agents. Chain lengthening agents which have primary hydroxyl groups are reacted in a dispersing agent containing exclusively secondary hydroxyl groups. A limited excess of isocyanate may also be used but the products then obtained have a relatively high viscosity, increasing with the amount of isocyanate excess used, since the excess of polyisocyanate reacts with the dispersing agent. Low molecular weight chain lengthening agents such as amine, hydrazine or hydrazide, on the other hand, may be used in large excess without causing an increase in the viscosity. Polyaddition products having reactive end groups and a limited molecular weight are obtained in such cases. The equivalent ratio of polyisocyanate to chain lengthening agent is generally kept between about 0.50 and about 1.50, preferably between 0.90 and 1.10. It is particularly preferred to use approximately equivalent quantities.

When polyisocyanates are reacted with polyamines, hydrazines or hydrazides in the presence of compounds having hydroxyl groups, the isocyanate groups react very preferentially with the amino groups but a certain proportion of the hydroxyl groups of the dispersing agent also take part in the reaction, depending on the reaction conditions. This reaction gives rise to polyurea and/or polyhydrazodicarbonamide chains which are chemically linked with the monohydric or, preferably, polyhydric alcohol used as dispersing agent. Such end groups presumably have a dispersing action on the solid particles. The extent to which the hydroxyl groups take part in the polyaddition reaction depends particularly on the reaction temperatures and on the water content. If too large a number of higher molecular weight polyol molecules react with the polyisocyanates, highly viscous dispersions are obtained. This occurs in the process described in German Auslegeschrift No. 1,260,142. On the other hand, if the proportion of polyol molecules taking part in the reaction is too low, the larger particles of the resulting dispersions are liable to be unstable and undergo sedimentation. The process has the surprising effect of making it possible to adjust the proportion of the NCO/OH reaction so that finely divided dispersions having the required low viscosity are obtained but at the same time coarser particles in the dispersion are still sufficiently stable so that they will not undergo sedimentation even during prolonged storage at elevated temperatures.

If, however, the reaction is carried out using low viscosity polyethers containing exclusively secondary hydroxyl groups or less reactive (aliphatic) isocyanates, the proportion of polyol molecules taking part in the polyaddition reaction may be too low to result in a stable dispersion. In such cases it is advisable to include emulsifying substances in the polyaddition reaction so that the stability of the dispersion will be increased. These emulsifying substances include linear polyethers having an average molecular weight of 300 to 4000 and carrying isocyanate groups or amino or hydrazide groups at both ends of the chain or preferably only at one end.

For example, minor quantities of isocyanate adducts of diols having the following general formula

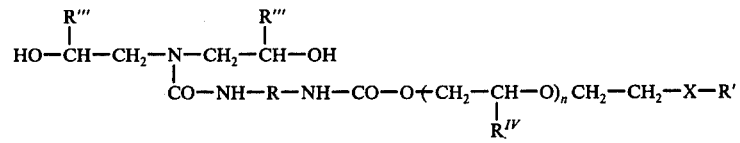

may be used as emulsifying agents. In the above formula,

R represents a divalent group such as can be obtained by removal of the isocyanate group from a diisocyanate having a molecular weight of from about 112 to about 1000;

X represents oxygen or —NR″—,

R′ and R″, which may be the same or different, represent monovalent hydrocarbon groups having from 1 to 12 carbon atoms, R‴ represents hydrogen or a monovalent hydrocarbon group having from 1 to 8 carbon atoms, $R^{IV}$ represents a hydrogen atom or a methyl group and n represents an integer of from 4 to 89.

The preparation of such emulsifying diols has been described, for example, in German Offenlegungsschrift No. 2,314,512.

Modified polyethers used as dispersing agents include those having the above general formula and also, for example, addition products of excess diisocyanates and/or polyisocyanates of the kind mentioned above with monofunctional and/or bifunctional hydroxyl polyethers having an average molecular weight of from 300 to 4000, which may be freed from unreacted free isocyanate by thin layer evaporation. If desired, these isocyanate prepolymers may also be reacted with excess free isocyanate to form allophanate isocyanates. Addition products containing isocyanate end groups may also be converted into polyethers containing amino or semicarbazide end groups by reaction with excess diamines or hydrazine, e.g. according to German Auslegeschrift Nos. 1,122,254 or 1,138,200.

Polyethers containing amino end groups, e.g. those prepared by the process according to U.S. Pat. No. 3,155,278 or German Auslegeschrift No. 1,215,373, may also be used as dispersing agents according to the invention.

Lastly, hydroxyl polyethers may be reacted with phosgene to convert them into chloroformic acid esters which may then be reacted with excess diamine or hydrazine. As already mentioned above, polyethers which carry an isocyanate or amino group at only one chain end are preferred as dispersing agents.

The modified polyethers which have a dispersing action are generally only added in quantities of up to about 15% by weight, preferably only up to 3% by weight (based on the total quantity of polyol and solid content) to the particularly preferred dispersions which have a solids content of about 10 to 60% by weight. If the dispersions have a higher or lower solids content, a correspondingly larger or smaller quantity of dispersing agent is used.

According to a less preferred variation of the process, compounds of the type mentioned above having two or more primary hydroxyl groups and a molecular weight of from 62 to 400 may be reacted with isocyanates (optionally together with monohydric primary alcohols) to produce polyurethane dispersions. In that case, however, it should be noted that only dispersing agents which contain exclusively secondary hydroxyl groups may be used and they should preferably have a molecular weight of more than about 500 in order to ensure selective reaction of the polyisocyanate with the primary hydroxyl compounds.

The quantity of water which should be present during the polyaddition reaction is of decisive importance in determining the particle size, the particle size distribution and the final viscosity of the dispersion. Several factors must be taken into account simultaneously: the viscosity and hydrophilic or hydrophobic character of the dispersing agent containing alcoholic groups, the solubility or emulsifiability of the starting components used for the isocyanate polyaddition reaction, the solids content of the resulting dispersion and the temperatures employed. The sequence and method of addition may also be of some influence. With increasing water content, a significant increase in viscosity occurs, particularly if a somewhat hydrophilic higher molecular weight dispersing agent is used. This effect becomes more pronounced with progressive polyaddition in alcohol diluted with water. The maximum quantity of water which may be added is therefore limited. In all cases it is necessary to ensure that the reaction mixture is vigorously mixed in the presence of water during the polyaddition reaction and during the subsequent removal of water by distillation. The quantity of water added would generally be less than 35% by weight but at least about 7% by weight, based on the total quantity of reaction mixture (the higher the desired solid content of the dispersion, the more water should be added). The optimum quantity of water is that which results in the lowest possible final viscosity of the dispersion but which does not require the removal of unnecessarily large quantities of water by distillation. The preferred quantity of water is in many cases between 10 and 25% by weight, based on the reaction mixture. Smaller quantities of water, upwards of about 4% by weight, may be used if the alcohols are strongly hydrophilic.

For obtaining a very low final viscosity, it is also advantageous to employ a very high reaction temperature from the start of the polyaddition reaction, preferably a temperature close to the boiling point of water.

When using stirrer vessels with reflux condensers, the heat produced in the strongly exothermic isocyanate reaction can easily be removed by boiling under reflux. At the same time, any adducts formed in the gaseous phase above the liquid reaction mixture can be continuously washed into the liquid phase by the water while still in statu nascendi and finely dispersed therein.

Various methods may be employed for mixing the dispersing agent with the reactants. In the simplest case, the hydroxyl containing dispersing agent, the necessary quantity of water and the amino compound, or primary hydroxyl compound, are introduced into a stirrer vessel and heated with stirring, for example to 70°-90° C. The isocyanate component is then added rapidly so that the reaction mixture boils vigorously under reflux. When producing dispersions with a high solids content, it is advantageous to introduce the polyisocyanate or polyisocyanate mixture into the lower third of the liquid in the reaction vessel. If suitable stirrer apparatus are employed, the reaction temperature may be raised to 105° to 115° C by employing a slight excess pressure. When the isocyanate groups have undergone complete reaction, the water and any inert solvent present are distilled off at reduced pressure and the dispersion is discharged through a sieve. In many cases, the amine compound optionally dissolved in water and the polyisocyanate may, of course, be introduced simultaneously into the mixture of dispersing agent and water. In that case, however, any excess of isocyanate should be avoided. Part of the heat of reaction may be used up, for example, by mixing the polyisocyanates with part of the alcohol used as dispersing agent at room temperature immediately before it is added to the reaction mixture. If the process according to the invention is desired to be carried out continuously, for example, in the case of a large scale commercial production of more than 1000 tons/mo., the dispersing agent, the various reactants and water may be continuously fed into continuous flow mixers. In view of the strongly exothermic nature of the reaction, which increases with increasing solid content, and hence the increasing vapor pressure, the residence time in the reactor must be so short that the reaction temperature in the premixer as far as possible does not exceed 100° C. When preparing a 40% dispersion, for example, the time required for the flow through the mixer should not be substantially above 1 to 3 seconds. The premixed reactants are then inroduced into a final stirrer vessel in which they stay for 20 to 30 minutes before being forced into another vessel for removal of the water by distillation.

Distillation of the water may also be carried out at a later stage, but the resulting dispersions then have a higher viscosity.

For obtaining very low viscosities, it is preferred practice to use the discontinuous process followed by immediate removal of water by distillation. This affords great simplicity, reliability in reaction control and reproducibility.

The quantity of water required for subsequent reactions, such as preparation of polyurethane foams, may of course be left in the finished dispersion.

The concentration of polyaddition products in the dispersing agent containing hydroxyl groups may vary within a wide range but is generally between about 1 and about 60% by weight and particularly between 5 and 50% by weight. The dispersions have viscosities of up to 80,000 cP and preferably up to 40,000 cP at 25° C, depending on their concentration. After dilution to a solids content of 10% by weight, they generally have a viscosity below 2500 and preferably below 1500 cP at 25° C. It is a special advantage of the process that in many cases dispersions prepared at very high concentrations have a relatively lower viscosity after dilution with the same dispersing agent than comparable products prepared from the start with low solids contents.

Dispersions with a surprisingly high solids content (up to 50% or more) can be prepared economically in stirrer vessels with reflux condensers in spite of the strongly exothermic reaction of isocyanate groups with amino groups. Since dispersions with a solids content of about 10% by weight are generally used for producing polyurethane resins, it is possible to mix the concentrated dispersions with large proportions by weight of those hydroxyl containing alcohols, e.g. polyesters, which might partially react with water or amino compounds, e.g. by hydrolysis or aminolysis at the temperatures at which preparation of the dispersion is carried out. Thus, for example, a 20% (10%) dispersion in which the proportion by weight of polyether to polyester is 3:5 (1:5) and which has a viscosity only slightly higher than that of the pure polyester or even lower can be obtained from a 40% polyhydrazodicarbonamide dispersion in polyether by stirring an equal quantity or three times the quantity of polyester into it (see Example 7).

It is surprisingly found that these dispersions in polyol mixtures are stable even if under otherwise identical conditions, the polyethers and polyesters are not miscible with each other. The polyurethane solids content dispersed in the product evidently acts as emulsifier, preventing separation of the system into two phases even during prolonged storage. This is another important advantage of the process since it makes it possible for novel polyurethane resin products not obtainable by any other method to be produced from such stabilized polyester/polyether systems.

The use of higher molecular weight hydroxyl polyethers as dispersing agents in the process makes possible as already mentioned above, a highly economic and variable method of commercial production. The process is carried out under mild conditions to produce dispersions having a high solids concentration which may, if desired, be used as master batches. The use of polyethers has, however, yet another important advantage: The large scale commercial production of polyethers leads in most cases to the formation of intermediate stages of aqueous crude polyethers which have a water content of from 8 to 12% and which contain 0.3 to 1% by weight of alkali metal sulphates in solution and 1 to 3% by weight of toluene in suspension. Such a crude polyether suspension is normally distilled under reduced pressure to reduce the water and toluene to a residue of from 0.4 to 1% by weight. The alkali metal sulphates are thereby precipitated and can be removed by means of sponge filters.

The polyether now free from sulphates and containing 0.5 to 1% by weight of water is substantially freed from its residual water by thin layer evaporation so that the water content of the purified commercial polyether is less than 0.5% by weight. It is not necessary, however, to use a highly purified, practically anhydrous polyether. The preliminary stages of crude polyether are satisfactory for the process. Either the substance obtained before thin layer evaporation or, what is particularly advantageous, the so-called crude polyether suspension (containing about 10% of water alkali metal sulphate and toluene) are suitable. The water, toluene and sulphate are removed by distillation and filtration after termination of the isocyanate polyaddition reaction.

According to another possible variation of the present invention, polyisocyanate polyaddition products dispersed in the polyhydroxyl compounds are subsequently cross-linked with formaldehyde in known manner in the presence of catalytic quantities of acids. It is surprisingly found that cross-linked dispersions of this kind are also finely disperse and stable in storage.

The special importance of the present invention lies in the fact that all the above mentioned improvements and modifications in the properties of polyurethane resins can be obtained using the usual raw materials and conventional, in most cases standardized, formulations.

The dispersions prepared by the above process can be used as "modified" lower or higher molecular weight polyhydroxyl compounds in known manner in reactions with polyisocyanates of the kind mentioned above, if desired together with unmodified polyhydroxyl compounds or polyamines, hydrazines or hydrazides of the kind mentioned above as chain lengthening agents. Blowing agents, catalysts and other additives may also be added to produce polyurethane resins with improved mechanical properties. Examples of the products which may be produced include foams, elastomers, homogeneous and porous coatings, lacquers and thermoplastic polyurethanes. In addition, the products of the process may be used as they are or after conversion to "modified" prepolymers by reaction with a polyisocyanate excess for producing aqueous polyurethane dispersions by known methods.

Suitable organic blowing agents include e.g. acetone; ethyl acetate; halogenated alkanes such as methylene chloride, chloroform, ethylidene chloride, vinylidene chloride, monofluorotrichloromethane, chlorodifluoromethane and dichlorodifluoromethane; butane, hexane, heptane and diethylether. The action of a blowing agent can also be obtained by the addition of compounds which decompose at temperatures above room temperature to liberate gases such as nitrogen, e.g. azo compounds such as azoisobutyric acid nitrile. Other examples of blowing agents and details concerning the use of blowing agents may be found in Kunststoff Handbuch, Volume VII, published by Vieweg and Hochtlen, Carl-Hanser-Verlag, Munich 1966, e.g. on pages 108 and 109, 453—455 and 507–510.

Catalysts may in many cases be used according to the invention, including known catalysts such as tertiary amines, e.g. triethylamine; tributylamine; N-methylmorpholine; N-ethylmorpholine; N-cocomorpholine; N,N,N',N'-tetramethylethylene diamine; 1,4-diazabicyclo-(2,2,2)-octane; N-methyl-N'-dimethyl-aminoethylpiperazine; N,N-dimethylbenzylamine; bis-(N,N-diethylaminoethyl) adipate; N,N-diethylbenzylamine; pentamethyldiethylenetriamine; N,N-dimethylcyclohexylamine; N,N,N',N'-tetramethyl-1,3-butanediamine; N,N-dimethyl-β-phenylethylamine; 1,2-dimethylimidazole; and 2-methylimidazole. The known Mannich bases obtained from secondary amines such as dimethylamine and aldehydes, preferably formaldehyde, or ketones such as acetone, methyl ethyl ketone, cyclohexanone and phenols such as phenol itself, nonylphenol or bisphenol may also be used as catalysts.

Suitable catalysts in the form of tertiary amines having hydrogen atoms which are reactive with isocyanate groups include e.g. triethanolamine, triisopropanolamine, N-methyldiethanolamine, N-ethyl-diethanolamine, N,N-dimethyl-ethanolamine and their reaction products with alkylene oxides such as propylene oxide and/or ethylene oxide.

Silaamines having carbon-silicon bonds may also be used as catalysts, for example those described in German Pat. No. 1,229,290 and U.S. Pat. No. 3,620,984, e.g. 2,2,4-trimethyl-2-silamorpholine and 1,3-diethylaminomethyl-tetramethyldisiloxane.

Basic nitrogen compounds such as tetralkylammonium hydroxides, alkali metal hydroxides such as sodium hydroxide, alkali metal phenolates such as sodium phenolate and alkali metal alcoholates such as sodium methylate may also be used as catalysts. Hexahydrotriazines are also suitable catalysts.

Organic metal compounds may also be used as catalyts according to the invention, in particular organic tin compounds.

The organic tin compounds used are preferably tin (II) salts of carboxylic acids such as tin (II) acetate, tin (II) octoate, tin (II) ethyl hexoate and tin (II) laurate, and tin (IV) compounds such as dibutyl tin oxide, dibutyl tin dichloride, dibutyl tin diacetate, dibutyl tin dilaurate, dibutyl tin maleate or dioctyl tin diacetate. Any of the above mentioned catalysts may, of course, be used as mixtures.

Other representatives of catalysts which may be used according to the invention and details concerning the action of the catalysts may be found in Kunststoff-Handbuch, Volume VII, published by Vieweg and Hochtlen, Carl-Hanser-Verlag, Munich 1966, e.g. on pages 96 to 102.

The catalysts are generally used in a quantity of between about 0.001 and 10% by weight.

Surface-active additives such as emulsifiers and foam stabilizers may also be used according to the invention. Suitable emulsifiers include e.g. the sodium salts of ricinoleic sulphonates or salts of fatty acids with amines such as oleic acid diethylamine or stearic acid diethanolamine. Alkali metal or ammonium salts of sulphonic acids such as dodecylbenzenesulphonic acid or dinaphthylmethane disulphonic acid or of fatty acids such as ricinoleic acid or of polymeric fatty acids may also be used as surface active additives.

Suitable foam stabilizers are, particularly, the polyether siloxanes, especially those which are water soluble. These compounds generally have a polydimethylsiloxane group attached to a copolymer of ethylene oxide and propylene oxide. Foam stabilizers of this kind have been described for example, in U.S. Pat. Nos. 2,834,748; 2,917,480 and 3,629,308.

Other additives which may be used according to the invention include reaction retarders, e.g. substances which are acid in reaction such as hydrochloric acid or organic acid halides; cell regulators known per se such as paraffins or fatty alcohols or dimethylpolysiloxanes; pigments; dyes; flame retarding agents known per se such as trischloroethylphosphate, tricresyl phosphate and ammonium phosphate and polyphosphate; stabilizers against ageing and weathering; plasticizers, fungistatic and bacteriostatic substances; and fillers such as barium sulphate, kieselguhr, carbon black or whiting.

Other examples of surface active additives, foam stabilizers, cell regulators, reaction retarders, stabilizers, flame retarding substances, plasticizers, dyes, fillers and fungistatic and bacteriostatic substances which may also be used according to the invention and details concerning their use and mode of action may be found in Kunststoff Handbuch, Volume VII, published by Vieweg and Hochtlen, Carl-Hanser-Verlag, Munich 1966, e.g. on pages 103 to 113.

The components used for production of the foams are reacted according to the invention by the known one-shot, prepolymer or semiprepolymer process, in many cases using mechanical devices such as those described in U.S. Pat. No. 2,764,565. Details concerning processing apparatus which may be used according to the invention may be found in Kunststoff-Handbuch, Volume VII, published by Vieweg and Hochtlen, Carl-Hanser-Verlag, Munich 1966, e.g. on pages 121 to 205.

The foaming reaction for producing the foams is often carried out inside molds. The reaction mixture is introduced into a mold made of a metal such as aluminum or a synthetic product such as epoxide resin and is foamed up inside the mold to produce the shaped product. Foaming inside molds may be carried out either to produce articles having a cellular structure on their surface or to produce articles having a compact skin and cellular center. According to the invention, one or other effect can be achieved by either introducing just sufficient reaction mixture into the mold to fill the mold after foaming or introducing a larger quantity of reaction mixture. The latter method is known as "overcharging", a procedure which has been described, for example, in U.S. Pat. Nos. 1,178,490 and 3,182,104.

The process of foaming in molds is frequently carried out using known "external mold release agents" such as silicone oils but so-called "internal mold release agents" may also be used, optionally in admixture with external mold release agents, e.g. as disclosed in German Offenlegungsschriften Nos. 2,121,670 and 2,307,589.

Cold setting foams can also be produced according to the invention as described in British patent specification No. 1,162,517 and German Offenlegungsschrift No. 2,153,086.

Foams may, of course, also be produced by the process of block foaming or by the known laminator process.

One factor which is of major importance in determining the improvement in properties of the resulting polyurethane resins, particularly the improvement in compression resistance, is the particle size of the dispersed polyaddition products. For example, when using polyether dispersions as starting material for the production of polyurethane foams, the diameter of the particles of filler must be substantially below the dimensions of the cell walls (20 to 50 $\mu$m). In polyurethane coatings, the particles must also be small enough to ensure that even very thin coatings will have a smooth surface and be applied evenly.

The process advantageously gives rise to dispersions having particle sizes of from 0.01 to 5 $\mu$m, preferably 0.1 to 1 $\mu$m, which satisfy the commercial requirements.

The following examples serve to explain the process according to the invention. The figures given represent parts by weight or percentages by weight unless otherwise indicated.

EXAMPLE 1

20% Polyhydrazodicarbonamide dispersion in trifunctional polyether:

Index (NCO/NH . 100) = 100

Reaction mixture:

80.0 parts by weight of a polyether of propylene oxide and ethylene oxide started on trimethylolpropane and having a hydroxyl number of 34 and containing about 80% of primary hydroxyl groups (hereinafter referred to as "polyether I") as dispersing agent;

16.9 parts by weight of tolylene diisocyanate (isomeric mixture of 2,4-: 2,6=80:20; hereinafter referred to as "T 80");

3.1 parts by weight of hydrazine (as 99% hydrate, optionally diluted with water before it is added to the reaction mixture).

Water content: see Table 1.

GENERAL METHOD

The dispersing agent preheated to 70° C and the hydrazine hydrate diluted with water are mixed in a stirrer vessel equipped with reflux condenser and heated to 80° C with stirring. The diisocyanate mixture is then rapidly introduced into the stirrer cone. Polyaddition sets in at once with vigorous boiling of the water under reflux.

After addition of the diisocyanate, the temperature is lowered to 60°-80° C within 20 to 30 minutes, if necessary with cooling, and the water is distilled off at reduced pressure. The temperature is allowed to rise to 90° to 120° C towards the end of the reaction until no more water distills over. The reaction mixture is then filtered through a 100 μm sieve when the viscosity allows it (Examples 1b and 1c).

TABLE 1

| Example | % by weight of water based on | | | | Viscosity 25° C (cP) 20% | Appearance |
|---|---|---|---|---|---|---|
| | Reaction mixture (including water) | Dispersing agent | Solids content | Dispersion (anhydrous) | | |
| 1a | 4.8 | 6.3 | 25.2 | 5.0 | 268.000 | Paste |
| 1b | 7.9 | 10.7 | 42.7 | 8.5 | 2.700 | Finely divided dispersion |
| 1c | 11.3 | 16.0 | 64.0 | 12.8 | 2.315 1.350 +) | " |

+) Diluted to a solids content of 10% by the addition of polyether I

COMPARISON EXAMPLE 1D

When Example 1 is repeated without the addition of water but under otherwise identical conditions, the reaction mixture becomes pasty even during the addition of diisocyanate.

COMPARISON EXAMPLE 1E

When Example 1 is repeated with 50% by weight of water in the reaction mixture, phase separation takes place. The reaction mixture becomes pasty on removal of water.

EXAMPLE 2

40% polyhydrazodicarbonamide dispersion in trifunctional polyether.

The formulation of the reaction mixture is similar to that in Example 1 but adjusted to a solids content of 40%.

At a water content of 20% by weight, based on the reaction mixture including water (this amounts to 41.5% by weight of 62% by weight or 25% by weight, based on dispersing agent or on solids content or on anhydrous dispersion), a very finely divided dispersion (0.3 to 2 μm) is obtained, which has a viscosity of 12,800 cP/25° C when the residual water content is 0.4% (when diluted with additional polyether I to a solids content of 20% or 10%, the viscosity is 1550 or 1050 cP/25° C).

REACTION CONDITIONS

The method of Example 1 is modified in that the process is carried out in a 500 l stirrer vessel and the diisocyanate mixture is introduced at slight pressure not into the stirrer cone but into the lower third of the vessel.

COMPARISON EXPERIMENT

Without the addition of water, the reaction mixture becomes pasty and the stirrer is brought to a standstill even before the total quantity of diisocyanate has been added.

EXAMPLE 3

20% Modified polyhydrazodicarbonamide dispersion in trifunctional polyether; Index = 100.
Formulation of reaction mixture:
  80.0 Parts by weight of polyether I;
  1.43 parts by weight of diisocyanate T 80;
  3.2 parts by weight of diol urea ether of the formula

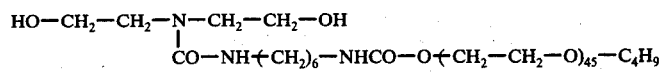

3.5 parts by weight of hydrazine (in the form of 99% hydrazine hydrate; added after dilution with water) and a total of
  11.9% by weight of water, based on the reaction mixture (= 16.8% based on dispersing agent; 67.4% based on slids content; 13.5% based on anhydrous end product).

The method is similar to that of Example 1 but the diol urea ether is previously reacted with an excess of diisocyanate (index 200) at 100° C and the remaining quantity of diisocyanate T 80 is added to it after cooling and the resulting mixture is introduced into the receiver.

The resulting very finely divided polyol dispersion has a viscosity of 2120 cP/25° C at a residual water content of 0.5% by weight.

EXAMPLE 3A

Index = 100.

Formulation of reaction mixture:

80.0 Parts by weight of a polyether (polyether II) of propylene oxide and ethylene oxide (hydroxyl number = 35; about 70% of primary hydroxyl groups) which has been started on trimethylolpropane:
  14.3 parts by weight of diisocyanate T 80;
  4.4 parts by weight of diethylene glycol;
  1.3 parts by weight of hydrazine (as 99% hydrate; introduced into the receiver as a dilution with water); and a total of
  13.7% by weight of water, based on the reaction mixture including water (= 19.8% based on dispersing agent; 73.4% based on solids content; 15.9% based on anhydrous end product).

The method is similar to that of Example 1 but a prepolymer is first prepared from diethylene glycol and part of the diisocyanate (index 200) and the remaining diisocyanate is then added to the prepolymer before it is introduced into the reaction mixture.

The viscosity of the resulting finely divided, substantially anhydrous 20% dispersion is 2670 cP/25° C.

EXAMPLE 4

A 38.3% dispersion in a linear polyether of an OH functional polyhydrazodicarbonamide polyurea.

$$\left(\frac{NCO}{NH} \cdot 100\right) = 100 \quad \text{Index 1}$$

$$\left(\frac{NCO}{NH + OH} \cdot 100\right) = 91 \quad \text{Index 2}$$

Formulation of reaction mixture:

- 61.7 parts by weight of a linear polypropylene glycol having secondary hydroxyl groups (hereinafter referred to as polyether III; OH number = 56);
- 31.0 parts by weight of diisocyanate T 80;
- 5.2 parts by weight of hydrazine (as 99% hydrazine hydrate; added as a dilution with water);
- 2.1 parts by weight of ethanolamine; a total of
- 22.3% by weight of water, based on the reaction mixture including water (= 46.5% based on dispersing agent: 75.1% based on solids content; 28.7% based on anhydrous dispersion).

The method is similar to that of Example 2.

The resulting stable polyether dispersion which has a residual water content of 0.2% by weight and a concentration of 40% has a viscosity of 2460 cP at 25° C or when diluted to 20% with the polyether used it has a viscosity of 680 cP/25° C or when diluted to 10% with the polyether used the viscosity is 510 cP/25° C.

EXAMPLE 4A

The formulation given in Example 4 is modified in a similar manner to Example 3, but using a prepolymer the reaction product of the diisocyanate with 3% by weight of the dispersing agent (based on the total solids content). The dispersion obtained is even more finely divided than that of Example 4 and it has excellent flow properties.

EXAMPLE 5

A 40%, highly cross-linked polyurea-polyhydrazodicarbonamide dispersion in trifunctional polyether; Index = 100.

Formulation of reaction mixture:

- 60.0 parts by weight of polyether I;
- 31.0 parts by weight of diisocyanate T 80;
- 2.9 parts by weight of hydrazine (added as hydrazine hydrate diluted with water);
- 6.1 parts by weight of diethylene triamine; a total of
- 18.9% by weight of water, based on the reaction mixture including water (=38.9% based on dispersing agent; 58.4% based on solids content; 23.3% based on anhydrous end product).

The stable dispersion prepared in a similar manner to Example 1 has a viscosity of 18,500 (3,800 or 2,200) cP/25° C at 40% (20% or 10%).

EXAMPLE 6

20% Polyhydrazodicarbonamide dispersion in polyester; Index = 100.

Formulation of reaction mixture:

- 80 parts by weight of a polyester of adipic acid, trimethylol propane and diethylene glycol (hydroxyl number = 56; acid number = 1; hereinafter referred to as polyester ATD);
- 16.9 parts by weight of diisocyanate T 80;
- 3.1 parts by weight of hydrazine (added as hydrazine hydrate diluted with water); a total of
- 11.3% by weight of water, based on the reaction mixture including water (= 16% based on dispersing agent; 64% based on solids content; 12.8% based on anhydrous polyester dispersion).

The method is similar to that of Example 1. A stable dispersion is obtained. Its viscosity at a solids content of 20% is 35,500 cP/25° C and at 10% the viscosity is 24,500 cP/25° C. The pure polyester has a viscosity of 21,400 cP/25° C.

COMPARISON EXPERIMENT

If no water is introduced into the receiver before the diisocyanate is added so that only the small quantity of water from the undiluted hydrazine hydrate is present, the reaction mixture completely solidifies even before all the diisocyanate has been added.

EXAMPLE 7

Dispersion in a polyether/polyester mixture

If the solids content of the 38.3% dispersion from Example 4 is reduced to 20% by weight of 10% by weight, respectively, by stirring polyester ATD (viscosity 21,400 cP/25° C) into the dispersion, a stable polyether/polyester mixture having a viscosity of 19,800 or 24,200 cP/25° C is obtained.

A mixture of pure polyether III and polyester ATD (without any solid dispersed in it), on the other hand, separates into two phases after only a few hours.

EXAMPLE 8

20% polyurethane dispersion in polyether containing secondary OH groups; Index = 100

Formulation of reaction mixture:

- 80.0 parts by weight of polyether III;
- 11.8 parts by weight of diisocyanate T 80;
- 8.2 parts by weight of N-methyl diethanolamine;
- 7% by weight of water, based on the reaction mixture including water (= 9.4% based on dispersing agent: 37.5% based on solids content; 7.5% based on anhydrous dispersion).

METHOD

Polyether, N-methyldiethanolamine and water are introduced into the stirrer apparatus at room temperature and the diisocyanate is added slowly with cooling so that the reaction temperature does not rise above 50° C. One hour after all the isocyanate has been added, the water is distilled off at reduced pressure. The temperature may gradually be raised to 90° C towards the end of distillation.

The viscosity of the resulting stable 20% dispersion is 2.210 cP/25° C.

COMPARISON EXPERIMENT

When the process is carried out without the addition of water to the reaction mixture but under otherwise identical reaction conditions, the dispersion obtained sediments overnight.

EXAMPLE 9

20% polyhydrazodicarbonamide dispersion in trifunctional polyether

Formulation of reaction mixture:

80.0 parts by weight of a polyether of propylene oxide and ethylene oxide (Hydroxyl number 28; approximately 80% of primary (hydroxyl groups) which has been started on trimethylolpropane;
7.1 parts by weight of tolylene diisocyanate; (isomeric mixture 2,4 : 2,6 = 65 : 35);
10.2 parts by weight of 4,4'-diphenylmethane diisocyanate;
2.7 parts by weight of hydrazine (as 99% hydrate; introduced after dilution with water); a total of
13.0% by weight of water, based on the reaction mixture including water (= 18.6% based on dispersing agent; 74.5% based on solids content; 14.9% based on anhydrous end product).

METHOD

The polyether is used in the form of a crude polyether suspension containing 10.5% of water and 0.5% of alkali metal sulphate and mixed with the hydrazine hydrate. Polyaddition takes place in situ as a result of the addition of a mixture of the above mentioned diisocyanates under the conditions specified in Example 1.

The resulting 20% dispersion which is stable and substantially anhydrous has a viscosity of 4200 cP/25° C. After dilution to 10% with a further quantity of (anhydrous) polyether, it has a viscosity of 2100 cP/25° C.

EXAMPLE 10

The method is completely similar to that of Example 9 but pure diphenylmethane diisocyanate is replaced by a crude MDI. The viscosity of the 20% and 10% stable dispersions, respectively, is 3200 and 1900 cP/25° C.

EXAMPLE 11

100 parts by weight of the polyhydrazodicarbonamidepolyether dispersion according to Example 1c adjusted to a solids content of 20%.

3.0 parts by weight of water,
0.2 parts by weight of triethylene diamine,
0.3 parts by weight of 2-dimethylamino-ethanol,
0.8 parts by weight of commercial polysiloxane foam stabilizer (OS 15 of Bayer AG) and
0.22 parts by weight of tin-(II)-octoate were mixed together. This mixture was vigorously stirred at room temperature with 24.1 parts by weight of tolylene diisocyanate (65% 2,4- and 35% 2,6-isomer) and
12.0 parts by weight of tolylene diisocyanate (80% 2,4- and 20% 2,6-isomer).

A creamy reaction mixture formed after 8 to 9 seconds. Its rise time was 75 seconds and its gel time 120 seconds.

The resulting foam was found to have the following mechanical properties:

| | |
|---|---|
| Gross density according to DIN 53 420 | 33 kg/m³ |
| Tensile strength according to DIN 53 571 | 160 KPa |
| Elongation at break according to DIN 53 571 | 190% |
| Compression resistance according to DIN 53 577 | 5.3 KPa |
| Indentation hardness according to ASTM D 1564-71T: | |
| H-value at 25% deformation (N) | 290 |
| H-value at 65% deformation (N) | 540 |
| RH-value at 25% deformation (N) | 200 |
| (25% RH-value/25% H-value) × 100 | 70% |
| 65% H-value/25% H-value | 1.9 |

COMPARISON EXPERIMENT

The same formulation was used except that the polyhydrazodicarbonamide dispersion was replaced by 100 parts by weight of polyether I used as dispersing agent. Observing the same ratio of NCO/OH groups (index), a foam of the same gross density is obtained but its compression resistance according to DIN 53 577 is only 4.8 KPa.

EXAMPLE 12

100 parts by weight of the dispersion from Example 1c,
5.0 parts by weight of water,
0.2 parts by weight of triethylene diamine,
0.3 parts by weight of 2-dimethylamino-ethanol,
1.0 parts by weight of polysiloxane foam stabilizer (OS 15 of BAYER AG) and
0.2 parts by weight of tin-(II)-octoate were mixed together. The resulting mixture was then stirred together with 28.55 parts by weight of tolylene diisocyanate (65% 2,4- and 35% 2,6-isomer) and
28.55 parts by weight of tolylene diisocyanate (80% 2,4- and 20% 2,6-isomer)

at room temperature. A creamy reaction mixture having a rise time of 55 seconds and a gel time of 100 seconds was obtained after 6–7 seconds.

The resulting foam was found to have the following mechanical properties:

| | |
|---|---|
| Gross density according to DIN 53 420 | 24 kg/m³ |
| Tensile strength according to DIN 53 571 | 140 KPa |
| Elongation at break according to DIN 53 571 | 180 % |
| Compression resistance according to DIN 53 577 | 4.1 KPa |
| Indentation hardness according to ASTM D 1564-71T: | |
| H-value at 25% deformation | 130 |
| H-value at 65% deformation | 255 |
| RH-value at 25% deformation | 95 |
| (25% RH-value/25% H-value) × 100 | 73% |
| 65% H-value/25% H-value | 2.0 |

EXAMPLE 13

100 parts by weight of the dispersion from Example 1c adjusted to a solids content of 10%,
3.0 parts by weight of water,
0.1 part by weight of triethylene diamine,
0.3 part by weight of 2-dimethylamino-ethanol,
1.0 part by weight of polysiloxane foam stabilizer (OS 15 of Bayer AG) and
0.18 parts by weight of tin-(II) octoate were mixed together. The resulting mixture was vigorously stirred together with 19.2 parts by weight of tolylene diisocyanate (65% 2,4- and 35% 2,6-isomer) and
19.2 parts by weight of tolylene diisocyanate (80% 2,4- and 20% 2,6-isomer)

at room temperature. A creamy reaction mixture having a rise time of 102 seconds and a gel time of 180 seconds was obtained after 10 seconds.

The resulting foam was found to have the following mechanical properties.

| | |
|---|---|
| Gross density according to DIN 53 420 | 34 kg/m³ |
| Tensile strength according to DIN 53 571 | 150 KPa |
| Elongation at break according to DIN 53 571 | 200 % |
| Compression resistance according to DIN 53 577 | 5.1 KPa |
| Indentation hardness according to ASTM D 1564-71T: | |
| H-value at 25% deformation | 275 |
| H-value at 65% deformation | 510 |
| RH-value at 25% deformation | 180 |
| (25% RH-value/25% H-value) × 100 | 65 |
| 65% H-value/25% H-value | 1.9 |

EXAMPLE 14

100 parts by weight of the dispersion from Example 1c,
5.0 parts by weight of water,
0.1 part by weight of triethylene diamine,
0.3 part by weight of 2-dimethylamino-ethanol,
1.2 parts by weight of polysiloxane foam stabilizer (OS 15 of Bayer AG) and
0.2 parts by weight of tin-(II) octoate were mixed together. The resulting mixture was vigorously stirred together with 28.85 parts by weight of tolylene diisocyanate (65% 2,4- and 35% 2,6-isomers) and
28.85 parts by weight of tolylene diisocyanate (80% 2,4- and 20% 2,6-isomer)

at room temperature. A creamy reaction mixture having a rise time of 60 seconds and a gel time of 100 seconds was obtained after 8 seconds.

The resulting foam was found to have the following mechanical properties:

| | |
|---|---|
| Gross density according to DIN 53 420 | 23 kg/m³ |
| Tensile strength according to DIN 53 571 | 140 KPa |
| Elongation at break according to DIN 53 571 | 190 % |
| Compression resistance according to DIN 53 577 | 3.9 KPa |
| Indentation hardness according to ASTM D 1564-71T: | |
| H-value at 25% deformation | 110 |
| H-value at 65% deformation | 235 |
| RH-value at 25% deformation | 80 |
| (25% RH-value/25% H-value) × 100 | 72 |
| 65% H-value/25% H-value | 1.9 |

EXAMPLE 15

100 parts by weight of the stable polyurea-polyhydrazodicarbonamide dispersion (polyester : polyether = 5 : 1) from Example 7 adjusted to a solids content of 10%,
4.0 parts by weight of water,
0.6 parts by weight of dimethylbenzylamine,
0.1 parts by weight of Sn-(II)-octoate and
2.0 parts by weight of a commercial polysiloxane foam stabilizer (OS 25 of Bayer AG)

were mixed together. The resulting mixture was intimately stirred together with 52.5 parts by weight of diisocyanate T 80 at room temperature.

A creamy reaction mixture having a rise time of 65 seconds and a gel time of 125 seconds was obtained after 10 seconds.

The resulting foam has open cells in contrast to pure polyester foams, which generally have closed cells, and on account of its uniform, very fine cell structure it is suitable, for example, as filter material.

When the example is repeated with a mixture of pure polyester and polyether mixed in the same proportions without polyurethane solids dispersed therein, an open celled foam is again obtained but its cells are substantially larger with the cell membranes still partly present.

The mixture of pure polyester and polyether is moreover not stable in storage, as already mentioned earlier. When left to stand at room temperature, it separates into two phases within a short time.

EXAMPLE 16

Homogeneous polyurethane sheets a. Preparation of a prepolymer 89.7 parts by weight of the 40% polyether dispersion from Example 2 are reacted with 10.3 parts by weight of diisocyanate T 80 at 100°–110° C until the free isocyanate content is 3.0% by weight. The resulting prepolymer has a viscosity of 24,800 cP/25° C and is stable in storage at room temperature.

b. Preparation of a polyurethane elastomer

The prepolymer is mixed with 0.2% by weight of tin-(II) octoate and spread out on a glass plate to form a layer 500 μm in thickness, using a doctor knife. The product obtained after heat treatment at 110°–130° C (30–60 minutes) is a film which has good mechanical properties and is resistant to organic solvents.

c. Solvent-free coating

When the same prepolymer is mixed with less than the equivalent quantity of ethanolamine by 5 equivalent % in a small capacity continuous flow high speed stirrer and the mixture is applied to a separating paper to form a layer 500 μm in thickness by the reversal process, using a doctor knife, the elastomer formed in this process solidifies within a few seconds in an infra-red channel. While the layer is still tacky, a textile substrate is placed on it under light pressure and the polyaddition reaction is completed in a heating channel with the temperature falling from 180° C to 120° C.

The coated fabric obtained in this way is highly resistant to abrasion and organic solvents.

COMPARISON EXPERIMENTS

When a prepolymer containing 3% of free isocyanate groups is prepared from the pure dispersing agent (polyether I) by a similar method to Example 16 and heated with the catalyst under otherwise identical conditions and cooled to room temperature, one merely obtains a transparent, sticky elastomer mass which has no structural stability and cannot be stripped from its substrate.

The addition of ethanolamine results in a similar sticky product.

EXAMPLE 17

Continuous method of carrying out the process of Example 1

The reactants are continuously fed into a reaction vessel from two storage vessels B 1 and B 2. Vessel B 1 contains a mixture of 10,000 parts by weight of polyether I, 612 parts by weight of hydrazine hydrate and 1380 parts by weight of water and vessel B 2 contains 2113 parts by weight of diisocyanate T 80.

The rate of feed is 119.90 g per minute from B 1 and 21.13 g per minute from B 2. The combined rate of feed is therefore 141.03 g per minute.

METHOD

Using a twin piston pump, the mixture which is heated to 95° C in B 1 and the diisocyanate from B 2, which is kept at 20° C, are combined coaxially in a static mixer (manufactured by Kenics; diameter ¼ inch; 21 elements; volume approximately 3 ml) (residence time in mixer about 1.3 seconds) and the mixture is delivered at a preliminary pressure of 2 to 3 bar into a steel reaction tube about 6 m in length. The diameter of this tube is about 9 mm and the temperature inside the tube is kept to 130° ± 5° C by heating or cooling.

The reaction tube ends in a separating vessel in which the practically anhydrous dispersion is restirred at a pressure of 20 Torr and temperature of 70° C during an average residence time of about 4 to 8 minutes. The separating vessel is connected to a distillation bridge and, via a pump, to another vessel used as receiver for the end product.

The resulting, finely divided, 20% dispersion has a viscosity of 2460 cP at 25° C.

EXAMPLE 17a (COMPARISON EXPERIMENT)

When Example 24 is repeated without using water, the reaction mixture already solidifies inside the static mixer so that delivery into the multiphase flow tube is practically impossible.

EXAMPLE 18

20% polyhydrazodicarbonamide dispersion in castor oil

Formulation:

- 80.0 parts by weight of castor oil;
- 16.9 parts by weight of diisocyanate T 80;
- 3.1 parts by weight of hydrazine (in the form of an aqueous solution of hydrazine hydrate); a total of
- 11.3 parts by weight of water.

The method is the same as that described in Example 1. The viscosity of the 20% dispersion at 25° C is 5950 cP.

EXAMPLE 18a (COMPARISON EXPERIMENT)

When Example 25 is repeated with a total water content in the formulation of only 1.8% by weight, based on the total mixture, the reaction product becomes pasty during removal of the water by distillation, and finally becomes rubbery.

EXAMPLE 19

Modification of a dispersion according to Example 1c with formaldehyde

A 37% aqueous formaldehyde solution (10% by weight of formaldehyde, based on the solids content of the dispersion) and a catalytic quantity of 85% phosphoric acid are added to the 20% polyhydrazodicarbonamide dispersion from Example 1c, optionally before the water is distilled off, and the mixture is gradually heated to 80°-90° C. The water is finally distilled off at reduced pressure.

The dispersion, which is substantially free from formaldehyde, is practically unchanged in its low viscosity at 25° C and can be used for producing polyurethane foams which have improved compression resistance.

EXAMPLE 20

The procedure is the same as described in Example 26 but 10% by weight of an aqueous solution of dimethylolurea, based on the solids content, is used instead of an aqueous formaldehyde solution for subsequent modification of the polyhydrazodicarbonamide dispersion.

The modification increases the viscosity of the polyhydrazodicarbonamides dispersion by only about 5%.

EXAMPLE 21

20% hydroazodicarbonamide-bis-urea dispersion in polyether III.

Formulation:

- 80.0 parts by weight of polyether III;
- 1.1 parts by weight of hydazine (used as hydrazine hydrate diluted with water);
- 1.2 parts by weight of ammonia (added as 25% aqueous solution); at total of
- 11.2 parts by weight of water;
- 17.7 parts by weight of 4,4'-diisocyanatodiphenylmethane.

METHOD

The dispersing agent and the aminofunctional compounds dissolved in water are introduced at room temperature into a stirrer apparatus equipped with reflux condenser, and the diisocyanate, which has been heated to about 100° C, is directly introduced into the liquid phase of the mixture with vigorous stirring. The reaction temperature rises to about 65°-75° C. Water is then removed at reduced pressure. The resulting finely divided, 20% dispersion has a viscosity of 1920 cP at 25° C.

The dispersion can easily be modified by after-treatment with formaldehyde in a similar manner to Example 26 to yield a dispersion with only slightly increased viscosity and containing polymethylene urea groups.

What is claimed is:

1. In a process for the production of polyurethane resins in which polyisocyanates are reacted with materials containing active hydrogen atoms and other known additives, the improvement wherein the active hydrogen containing material is a stable dispersion of nonionic polyisocyanate-polyaddition products in hydroxyl containing compounds as dispersing agents which are formed by the process which comprises reacting
1. organic polyisocyanates with
2. compounds having primary and/or secondary amino groups and/or primary hydroxyl groups in
3. as dispersing agent, compounds having at least one hydroxyl group and a molecular weight of between about 62 and about 16,000 wherein compounds (3) having secondary groups in cases where compounds (2) have primary hydroxyl groups, and wherein the components are reacted in the presence of more than 4% by weight of water, based on the quantity of reaction mixture including water.

2. The process of claim 1 wherein the water is subsequently removed in known manner.

3. The process of claim 1 wherein the polyurethane resin is a foam produced with the addition of a blowing agent.

* * * * *